United States Patent [19]  [11]  4,358,548
Saidla  [45]  Nov. 9, 1982

[54] CELLULAR FORMING AGENT IN RESINOUS SYSTEMS AND RESULTING PRODUCTS

[75] Inventor: Glen W. Saidla, Stratham, N.H.

[73] Assignee: Whitney & Company, Inc., Stratham, N.H.

[21] Appl. No.: 111,664

[22] Filed: Jan. 14, 1980

[51] Int. Cl.$^3$ ............................................. C08J 9/08
[52] U.S. Cl. .................................... 521/128; 521/94; 521/96; 521/97; 521/113; 521/146; 521/154; 521/157; 521/172; 521/178; 521/184; 521/189
[58] Field of Search ..................... 521/94, 96, 97, 113, 521/128, 157, 172, 182, 146, 184, 189, 178, 154

[56] References Cited

U.S. PATENT DOCUMENTS

| | | | |
|---|---|---|---|
| 2,740,743 | 4/1956 | Pace | 521/137 |
| 3,256,217 | 6/1966 | Landler et al. | 521/137 |
| 3,404,106 | 10/1968 | Bearden et al. | 521/172 |
| 3,404,107 | 10/1968 | Bearden et al. | 521/171 |
| 3,573,232 | 3/1971 | Kloker et al. | 521/137 |
| 3,823,099 | 7/1974 | Doyle | 521/182 |
| 4,216,294 | 8/1980 | Halle et al. | 521/99 |

FOREIGN PATENT DOCUMENTS 1028908  5/1966  United Kingdom ................ 521/157

*Primary Examiner*—Morton Foelak

[57] ABSTRACT

For forming synthetic cellular materials, gas is generated by the reaction of an isocyanate and a hydroperioxide. The reactants produce a novel polymeric amine oxide foam. When the reactants are introduced to a base resin, cellular foam products (densities throughout the 50 to 2 lbs/ft$^3$ range), extended resin products of even higher densities, and non-shrink resinous solids (with microcellular distribution of gas) can be obtained. When employed in resins curable with hydroperoxide, a small fraction of the hydroperoxide interacts with a promoter and serves to cure the resin while the larger fraction reacts earlier with the isocyanate to evolve gas before the gellation state of the base resin is reached. The foaming agent can be made commercially available as a premixture of isocyanate and appropriate surfactant for the hydroperoxide reaction. By mixing with low hydroxyl and carboxyl base resin, long pot life is obtainable. The hydroperioxide is kept separate until foaming or cell production in the base resin is desired.

43 Claims, 2 Drawing Figures

CELLULAR FORMING AGENT IN RESINOUS SYSTEMS AND RESULTING PRODUCTS

BACKGROUND OF THE INVENTION

This invention relates to means for producing gas throughout a mass of synthetic resin, and to resultant synthetic resin products.

The production of gas in resin has a number of uses. By way of example, gas can be generated to produce a foamed cellular product (by action of a blowing agent added to the resin), or to ensure the filling of a mold cavity or to prevent shrinking during curing of such a product (use of an agent for anti-sink or anti-shrink purposes). There has long been active interest in finding improved gas generation methods, particularly for polyester resins.

Specifically, in systems using chemical means to generate gas within the resin, it is desirable to have a simple, reproducible means of gas generation which does not require external addition of heat and which does not interfere with the product. For example, systems requiring the addition of water or acid may be deleterious to the curing and strength of the product in free-radical polymerizations. Ideally, a chemical gas generating system would be inexpensive and require inexpensive equipment, would utilize components that are nontoxic and have a long shelf life (both individually and when mixed with other resin system components), would be capable of achieving a full range of foam densities, and would permit a controlled induction period after mixing so that the reaction system can be poured into a mold or otherwise formed before gas generation takes place. Capability for loading foams with fillers and reinforcements is also desirable. Finally, it is desirable that such gas-generating components be capable of functioning over a non-critical range of proportions without harming or altering the composition of the product. Unfortunately, to date, for many resin systems, the previously known blowing agents are inadequate in a number of these respects.

With regard in particular to polyester resins, there has been no wholly satisfactory foaming method. For this reason the extremely good properties of polyesters—e.g., high strength, resistance to heat distortion and, with fire retardants, relatively low flammability—have been unavailable for many applications. Azo foaming systems are expensive, explosive, toxic and require refrigeration and other special handling. Other known systems are not capable of achieving low density and, therefore, result in expensive products, and produce gases which, for temperature insulation purposes, have poor thermal qualities. Still other proposed foaming systems for polyester, e.g., those employing a urethane reaction, have produced amide, urea or urethane linkages which are undesirable in many polyester applications. Such systems have also preferably required high hydroxyl-content polyester resins, which result in shortened pot life.

In addition to the need for improved gas-generating means or blowing agents in general, and for better agents for use with polyester resins in particular, there is also a need for new resin systems that have improved physical properties from the point of view of cost-benefit, such as better combinations of strength, lack of friability, better heat resistance and better sound and thermal insulating properties.

SUMMARY OF THE INVENTION

According to the invention a new method of producing carbon dioxide in a mass of synthetic resin composition is provided, comprising dispersing an organic isocyanate and an organic hydroperoxide in reactive quantities in the resin and allowing them to react while the resin is in a fluid state. For producing the $CO_2$ in gaseous form the pressure conditions are provided that permit its evolution.

For producing certain permanent cellular foam products according to the invention, the resin composition employed is chosen to characteristically pass through a gellation stage before reaching a solid state, the blowing reaction is regulated (by selection of the quantities of reactants and reaction conditions) to occur before the resin reaches the state of gellation that would restrain foaming (thus enabling the formation of a distribution of cellular voids by evolving $CO_2$ gas), and the resin then proceeds through gellation and cure in a manner to substantially maintain the distribution of cellular voids in the composition.

For cellular foam products, preferably the quantities of reactants and conditions are chosen to produce densities less than 50 lbs/ft$^3$ and in many cases preferably densities less than 12 lbs/ft$^3$, down to 2 lbs/ft$^3$.

According to another aspect of the invention the quantities of reactants and conditions are chosen to form, in situ, a dispersion of strong-walled hollow cells throughout a substantially continuous mass of solidified resin, thereby effectively to extend the resin, much in the nature that preformed glass extender spheres are sometimes added to resin; preferably for such "extender" use the reactant quantities and conditions are chosen to produce a cured resin mass of density between about 40 and 60 lbs/ft$^3$.

According to still another aspect of the invention the quantities of reactants and pressure and other conditions are chosen to confine the $CO_2$ to virtually invisible microcellular size, and in quantities not substantially affecting the density of the final resin product, the expansive tendencies of the dispersed $CO_2$ effective during molding to render the initial mold charge expansive, for instance to assure filling of the mold, or to avoid sink marks or shrink effects.

For achieving the above results, preferably the reaction proceeds according to the formula:

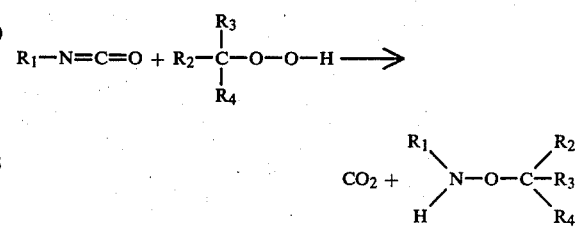

wherein $R_1$ is an aryl group, and $R_2$, $R_3$ and $R_4$ are selected from the groups consisting of aryl and aliphatic groups, preferably $R_1$, $R_2$, $R_3$ and $R_4$ being hydrocarbons. The residue, an amine oxide, preferably resides in the resinous mass in a cross-linked state at the cell boundaries and serves to strengthen the cured mass.

Preferably the isocyanate is an aromatic isocyanate or has comparable reactivity, i.e. has a reactivity greater than that of an essentially uncatalyzed aliphatic isocyanate. In preferred embodiments the agent is methyl diphenyl isocyanate ("MDI"). Preferably the isocyanate is provided in a premixture with a low hydroxyl, non-reactive surfactant in ratio to promote foaming when organic hydroperoxide is added, preferably the isocyanate and surfactant being present in the ratio of between about 95 to 5 down to 85 to 15, by weight. Such mixture, advantageously, can be added at a time well before foaming is called for, to a base resin chosen to have a low hydroxyl and carboxyl content, with resultant long pot life of the mixture.

Preferably the hydroperoxide is provided in a diluted form and is an alkyl hydroperoxide or methyl ethyl ketone peroxide ("MEKP"), preferably the latter. Advantageously the base resin has at least one polymerizable ethylenic unsaturation and the hydroperoxide is provided in such excess quantity as not only to provide the gas-producing reaction with the isocyanate, at the time of desired foaming, but also to serve as a curing agent for the resin immediately after the foaming has occurred. In embodiments of this feature the resin is from the group consisting of unsaturated polyester, styrene, acrylic, vinyl, and urethane. The invention, more broadly, consists of a cellular product of any of these resins, or thermoset resins not substantially cured by the hydroperoxide, e.g. epoxy, phenolic, urea, nylon, isocyuranate or silicone resins, or of thermoplastics (e.g. polyethylene, polypropylene or polycarbonate). The mixture can be formulated (e.g. by choice of amount and kind of surfactant) to produce closed cell products with $CO_2$ captured in the cells, (alone or with other gases provided by other additives, e.g. for thermal insulation) or to be of open cell structure (e.g. by choice of surfactant) as for sound insulation. Similarly, the mixture can be formulated to produce rigid or flexible products as desired, and to be formed (e.g. molded or sprayed) by conventional equipment.

According to an important specific aspect of the invention, however, the base resin comprises unsaturated polyester, preferably with low hydroxyl and carboxyl numbers, and the cured resin is essentially free of urea, urethane or amide linkages. For producing polyester foam of density less than about 50 lbs/ft$^3$, the isocyanate is present in quantities between about 5 and 25 percent by weight of the base resin and the isocyanate and hydroperoxide are introduced in ratios in the range between about 10 to 1 and 1 to 2 by weight, isocyanate to hydroperoxide product (this latter product being diluted, a 60 percent hydroperoxide solution). Preferably, for polyester foam having density less than about 12 lbs/ft$^3$, and with the isocyanate to base resin in the above range, the ratio between isocyanate to the hydroperoxide (diluted) is about 3 to 1 and 1 to 2.

And according to yet another aspect of the invention, a polymerized cellular amine oxide resinous mass is produced, useful by itself, as the reaction product of an organic isocyanate and an organic hydroperoxide.

These and other features of the invention will be understood from the following description of preferred embodiments, taken in conjunction with the drawings.

DRAWINGS

PREFERRED EMBODIMENTS

The Gas Generating Reaction

As mentioned, an organic isocyanate and an organic hydroperoxide are reacted to produce gas, chiefly found to be $CO_2$, and a resinous residue. The residue is identified as an amine oxide polymer, from the following reaction that is believed to occur:

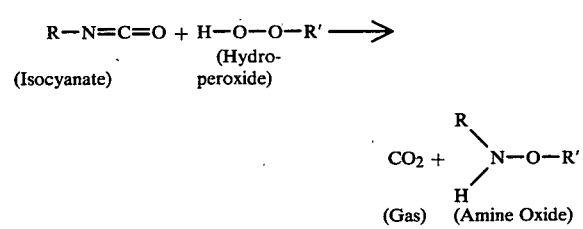

Examples of suitable isocyanates are aromatic isocyanates, (and isocyanates having a reactivity comparable to aromatic isocyanates), including tolylene diisocyanates, diphenyl methane diisocyanates (methyl diphenyl isocyanate or "MDI"), napthalene diisocyanates, triphenylmethane triisocyanates, phenylene diisocyanates, and polymeric polyisocyanates. Suitable hydroperoxides include alkyl hydroperoxides such as cumene hydroperoxide and butanone hydroperoxide (methyl ethyl ketone peroxide or "MEKP"). Both reactants may be present as a monomer or as various polymeric homologues.

The reaction is exothermic and proceeds at room temperature and ambient pressure to evolve $CO_2$ and produce a polymeric residue that is frothy, highly cross-linked, non-melting (i.e., thermoset), has a high service temperature, is a good insulator, has high compressive strength and is resistant to common solvents and weathering. When difunctional reactants are used (e.g. MDI or MEKP), one or both of the functional groups of each reactant may participate in the reaction, depending, for example, on stearic hindrance present in the molecule.

EXAMPLES OF THE GAS GENERATING REACTION

In order to provide an example of the gas generating capability of the two components, a series of reactions was observed using different weight ratios of the components. The specific isocyanate reactant used was a commercial MDI agent comprising MDI monomer and higher polymeric homologues (Mondur MR, from Mobay Chemical Co., Pittsburgh, PA). The hydroperoxide reactant used was a commercial MEKP agent comprising a 60 percent solution of MEKP and higher polymeric homologues in an inert solvent, dimethyl pthalate (DDM from the Lucidol division of Pennwalt Corp., King of Prussia, PA).

For each experiment, the two reactants were weighed into a small cup and mixed together at room temperature (about 68° F.) and ambient pressure for about 30 seconds. The resulting reaction was significantly exothermic. The evolved gas was then measured, as summarized in the following table:

TABLE 1

| Ratio by Weight of MDI Agent to MEKP Agent | ml of Gas per Gram of Mixture |
|---|---|
| 0.10 | 4.9 ml/g |

TABLE 1-continued

| Ratio by Weight of MDI Agent to MEKP Agent | ml of Gas per Gram of Mixture |
|---|---|
| 0.19 | 115.0 ml/g |
| 0.48 | 111.0 ml/g |
| 0.91 | 58.3 ml/g |
| 1.67 | 55.4 ml/g |
| 3.13 | 48.4 ml/g |
| 6.69 | 14.1 ml/g |
| 9.65 | 3.3 ml/g |

Figure 1:
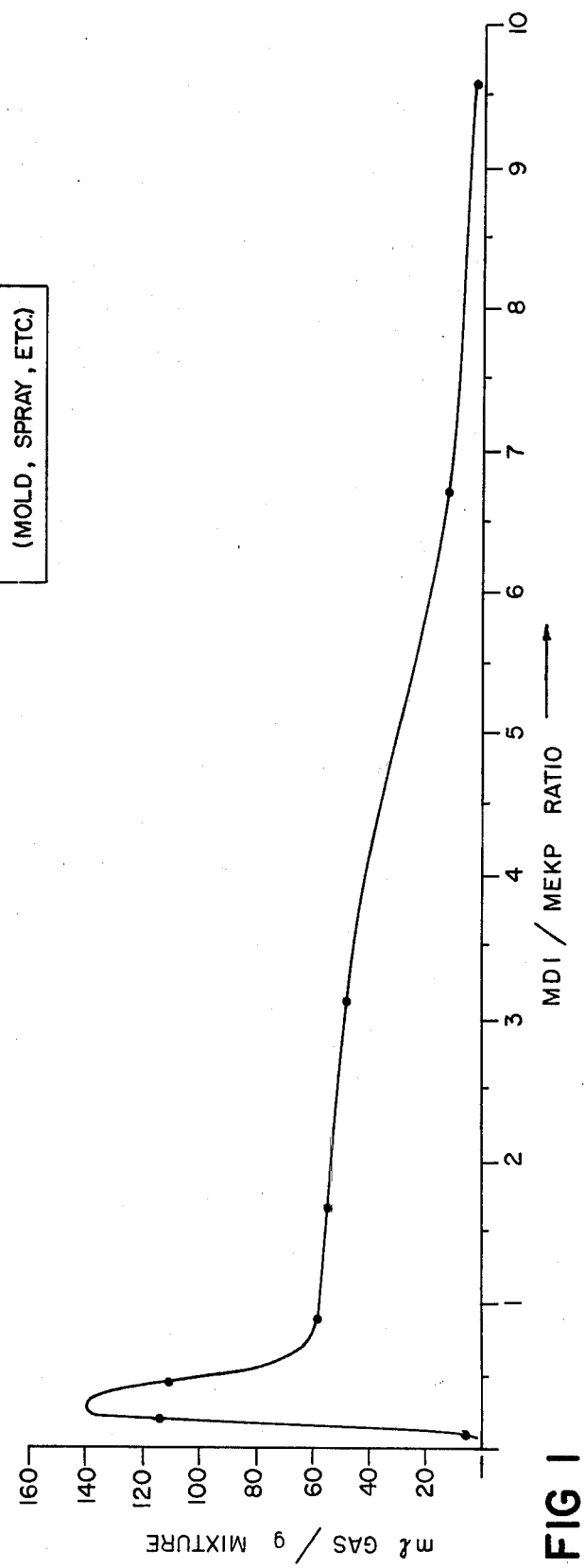
FIG. 1 is a curve depicting gas evolution from the reaction of various ratios of an isocyanate and a hydroperoxide.

Those results are summarized in the graph of FIG. 1, showing that the gas evolved per gram of mixture peaks at about 140 ml/g mixture at an MDI to MEKP agent ratio between about 0.25 and 0.30. (When the weights used are corrected to remove the solvent weight, the maximum amount of gas evolved by the reactants increases to about 180 ml/g corrected mixture, which is within the range theoretically predicted by the above reaction.)

The above gas generating reaction is advantageously used to foam various resins, esp. polyester resins. The gas generated can be controlled to produce a wide range of densities of foam products. Additionally, the reaction can be used to produce a resinous product of microcellular composition that does not shrink during curing, or it can be used to produce a gaseous resin mixture that can later be extruded or cured by various means. Because the resultant cell structure can be strong (and strengthened by the amine oxide reaction product) the reaction can be employed to extend resins in high density applications, e.g. 30 lbs/ft$^3$ to 60 lbs/ft$^3$, and thus can supplant use of special extenders such as preformed glass spheres added to resin.

USE OF THE GAS GENERATING REACTION IN AN UNSATURATED POLYESTER RESIN SYSTEM

The unsaturated polyester resin may be prepared by the condensation of an unsaturated dicarboxylic acid, such as maleic or fumaric acid, with a glycol or mixture of glycols, such as ethylene glycol, propylene glycol, 1,4-butanediol 1,6-hexanediol, or diethylene glycol. Saturated acids, for example phthalic acid, sebacic acid, or adipic acid, are sometimes included in the composition to reduce the amount of unsaturation in the final product, making it more flexible and tougher. Where long pot life is desired, it is desirable to use a polyester resin which is substantially free of hydroxyl groups or carboxyl groups; that is, the resin has a hydroxyl number of less than 15, preferably less than 10 and most preferably substantially zero, and an acid (carboxyl) number of less than 15, preferably less than 10, and most preferably substantially zero. (High hydroxyl and/or high carboxyl resins are operable, according to the invention, for instance where all components are mixed together simultaneously and immediately introduced to a mold. In such cases a polyisocyanate may be used, and the final product may contain amide, urea or urethane linkages. In the case of a polyester base resin, the resulting product may be a polyester urethane.)

There is customarily added to the unsaturated polyester resin a vinylic monomer. This vinylic monomer serves as a solvent or diluent for the unsaturated polyester resin and as a comonomer therefor. Such vinylic monomers are usually referred to as cross-linking agents for the unsaturated polyester resin. Examples of such cross-linking monomers are styrene and diallyl phthalate.

Figure 2:
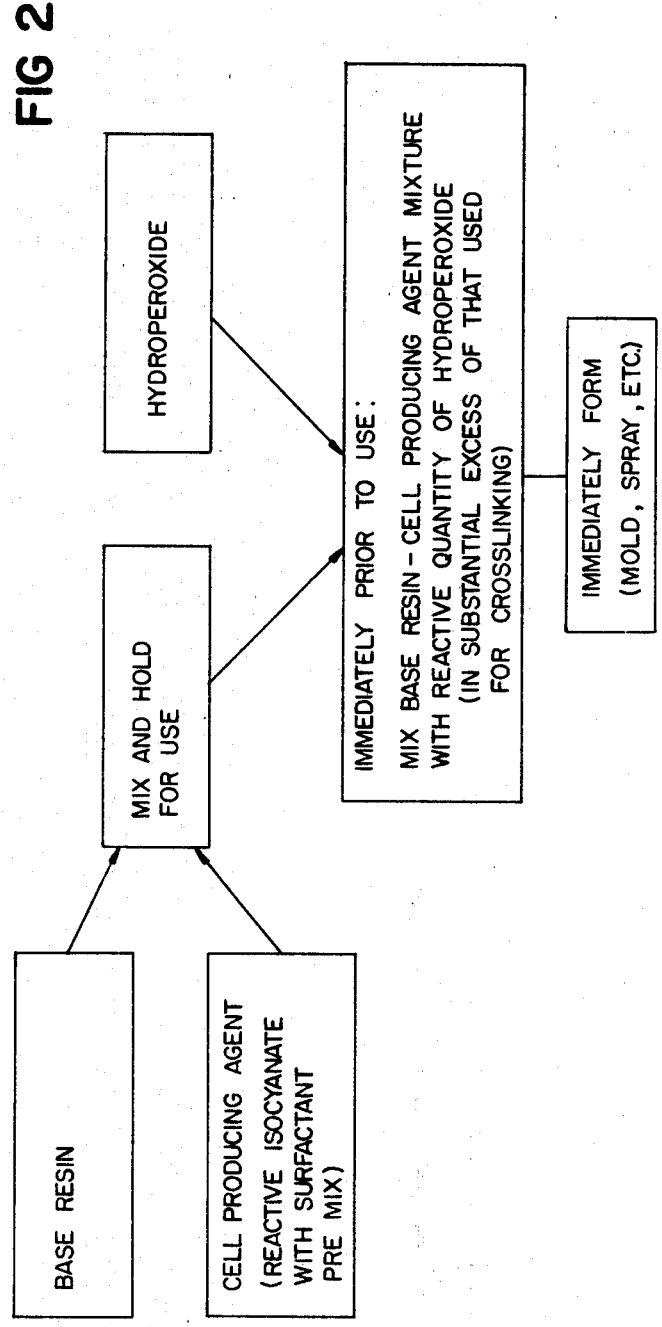
FIG. 2 is a flow diagram of a resin foaming sequence.

Referring to FIG. 2, foaming of an unsaturated polyester resin is preferably accomplished by first obtaining a mixture of the reactive isocyanate and a surfactant. The surfactant, which is used to control the size and size distribution of cell-forming bubbles, can be any suitable agent (preferably non-ionic) that adjusts the surface tension to promote the desired cell formation when hydroperoxide is reacted with the isocyanate. To make a commercially available premixed blowing agent, a low hydroxyl surfactant, non-reactive with isocyanate is prepared, with ratio of isocyanate to surfactant between about 95 to 5 down to 85 to 15, by weight. Preferably a silicone such as a polyoxyalkylene polysiloxane polymer is employed. (Such premixed foaming agent has a long shelf life.)

Well in advance of the desired cell production, the base resin is mixed with this foaming agent. (With resins of low hydroxyl content a long pot life has been demonstrated.)

At the time foaming is desired a reactive quantity of hydroperoxide is admixed with the base resin—isocyanate-surfactant mixture. For the gas-formation reaction to take place, the hydroperoxide is added in substantial excess over that which may be consumed in cross-linking or curing of the polyester resin. (Typically $\frac{3}{4}$ to 2 percent of the dilute hydroperoxide, relative to base resin, is used for curing; generally a larger fraction of the added hydroperoxide will be employed in the isocyanate reaction than in the curing action.) The foaming reaction initiates at room temperature (about 68° F.) and ambient pressure and can be adjusted to have an induction period of from one to twelve minutes, permitting transfer of the mixture to a mold or forming apparatus.

As gas is evolved from the reactants, the resinous mass expands and the excess hydroperoxide serves to gel and cure the polyester. The timing of the gas evolution and gellation can be regulated (as by choice of the quantity of promoter, see below) such that gas evolution substantially precedes the degree of gellation that would restrain foaming. The gas will thus form the desired voids throughout the resin, and these will be maintained as the resin soon proceeds to cure. The resulting cured resin is a solid foam of fine uniform cell size. Examination under magnification reveals a brownish substance in the cell structure. It is believed that this substance, an amine oxide polymer reaction product, contributes (e.g. as a reinforcing "lining") to the strength of the cell walls.

Advantageously, the foaming system does not interfere with curing of the resin, the system is simple and can be used with conventional equipment, and no special temperature or handling is required to avoid explosions, toxic effects or degradation.

The resulting foam product has the advantageous properties of a polyester resin, and the product can be made essentially free of amide, urea or urethane linkages (e.g. by appropriately limiting the hydroxyl and carboxyl content of the resin used). As will be apparent from the following examples, the foaming reaction is useful over an extremely wide range of product densities.

EXAMPLES OF FOAMING AN UNSATURATED POLYESTER RESIN

The following examples of foaming and curing of an unsaturated polyester resin were observed using the commercial MDI (isocyanate) and MEKP (hydroperoxide) products described above (Mobay's Mondur MR and Lucidol's DDM, respectively.) The resin used in each case was Reichold Chemical Co.'s 31-001 orthophthalic polyester resin to which 0.15 percent of a 6 percent cobalt napthenate promoter was added. The MDI foaming agent was present as a mixture of 95 percent of the commercial MDI product mentioned above and 5 percent surfactant (L-5340, a silicone surfactant from Union Carbide Co.). This MDI-surfactant foaming agent was combined with the resin in ratios of 10, 15 and 20 percent by weight of mixture to resin. The resulting combination was then reacted with the commercial, diluted MEKP product described above, in a range from 3 to 10 percent by weight of the dilute MEKP agent to total reaction mixture. The reaction began at room temperature (about 68° F.) and ambient pressure. After an induction period of about six minutes the isocyanate-hydroperoxide (exothermic) reaction proceeded, followed by the cobalt-hydroperoxide exothermic interaction. The $CO_2$ evolved and the resin continued to expand until the exothermic temperature reached about 140° F., at which time gellation occurred. The density of the resulting free-rise products was measured. The results are summarized in the following table:

TABLE 2

Free Rise Polyester Foams

| | | % (Weight) MDI-Surfactant Mixture to Resin | | |
|---|---|---|---|---|
| | | At 10% density | At 15% density | At 20% density |
| Weight Dilute | 3% | 49.0 lbs/ft$^3$ | 34.3 lbs/ft$^3$ | 29.8 lbs/ft$^3$ |
| MEKP, as | 4% | 41.3 lbs/ft$^3$ | 31.1 lbs/ft$^3$ | 22.9 lbs/ft$^3$ |
| Percentage | | | | |
| of Weight of | 5% | 33.1 lbs/ft$^3$ | 27.7 lbs/ft$^3$ | 16.7 lbs/ft$^3$ |
| The Combined | 6% | 22.8 lbs/ft$^3$ | 20.1 lbs/ft$^3$ | 11.4 lbs/ft$^3$ |
| Resin and MDI | 7% | 17.2 lbs/ft$^3$ | 12.9 lbs/ft$^3$ | 9.1 lbs/ft$^3$ |
| Surfactant | 8% | 11.5 lbs/ft$^3$ | 7.6 lbs/ft$^3$ | 4.8 lbs/ft$^3$ |
| Mixture | 10% | 8.6 lbs/ft$^3$ | 5.7 lbs/ft$^3$ | 3.4 lbs/ft$^3$ |

The above examples were chosen to ensure compatibility with existing foaming equipment—e.g. considering the limits of typical pumping equipment for peroxides. By controlling temperature, additional density control is possible; for example, Table 2 shows that using the 10 percent MDI-surfactant/resin ratio, with 7 percent of the dilute MEKP, starting at room temperature, yields a product having a density of 17.2 lbs/ft$^3$. By increasing the starting temperature of the mixture to 100° F., a density of 5.7 lbs/ft$^3$ has been achieved.

The range of densities can be increased further to provide a very low density foam product (e.g. 2 to 4 lbs/ft$^3$) using a low-shrink additive such as a vinyl ester, methyl methacrylate or Union Carbide LP-60. Higher density (e.g. up to the 60–70 lbs/ft$^3$ range) can be achieved by decreasing the ratio of foaming ingredients and by cooling the reactant mixture. In a particularly high density application the reactants are provided to produce minute or microcellular voids in a substantially continuous solid resinous article (density of the order of 60 to 70 lbs/ft$^3$) to counteract sink marks or shrinkage during curing.

The amount of promoter is restricted to prevent premature gellation that would restrain expansion (e.g. in the system above the cobalt napthanate solution is preferably restricted to less than 0.3 percent, preferably less than 0.2 percent by weight of the base resin).

Further examples of the use of the invention for molded polyester foam products are as follows:

EXAMPLE A

Fifty g of Reichold Chemical polyester resin 33-072, considered a "fast" resin (with relatively high, perhaps 0.5 percent of the cobalt napthanate or equivalent) was mixed with 10 g of foaming agent premixture, which consisted of a ratio of 90 percent commercial MDI product described above and 10 percent of a low hydroxyl surfactant non-reactive with the isocyanate (Dow Corning DC-193). A mixture of 4 g of the dilute MEKP product described was then added to the resin foaming agent mixture. The entire mixture was placed in a mold and after approximately a 6 minute induction period, beginning at room temperature, the mass expanded into a cellular body which set to a solid polyester foam having a fine, uniform cell structure and a density of about 10 lbs/ft$^3$. (The resin used has a relatively high hydroxyl number and the mixture a short pot life. It should be most appropriately used, e.g. in multi-component systems, where all mixing occurs shortly before use. In this case, the resultant product may contain amide, urea or urethane linkages.)

EXAMPLE B

Same as Example A above using Dow Corning L-520 surfactant and yielding a foam of 9 lbs/ft$^3$.

EXAMPLE C

Same as Example B using 18 g of Mobay Chemical Co. TD 80 (a mixture of tolylene diisocyanate and its polymeric homologues). The foam had a density of 6 lbs/ft$^3$.

EXAMPLE D

Same as Example C using 8 g of the MEKP product. The foam had a density of 4 lbs/ft$^3$.

The above examples of a "fast" resin are given to illustrate operability of the invention. Such "fast" resins however, if chosen, would be more appropriate for use in closed mold applications, for higher density products where there is less opportunity for voids to form or strain to be placed on cell walls due to expansion tendencies after gellation has begun. For lower densities or for spray applications, such as spray-formation of bath tubs and enclosures, if the same make resin is desired, the Reichold 33 071 resin (lower promoter, about 0.3 percent cobalt solution or equivalent) can be employed. On the other hand where gellation of a resin such as Rechold 31 001 is desired to be speeded up, DEA or other accelerators may be employed or the mixture heated.

The following is an example to illustrate another ratio of the reactants:

EXAMPLE E

Same as Example A using 2.5 g of a foaming agent mixture consisting of 95 percent of the MDI product and 5 percent L-5340 Union Carbide surfactant, 5 percent MDI to base resin. 3.7 g MEKP dilute product was added (ratio of 1 to 1.5 MDI to MEKP products). The resultant foam had a density of 22.8 lbs/ft$^3$.

OTHER EMBODIMENTS

Other embodiments are within the following claims. For example various accelerators such as tin catalysts, diamines, or dimethyl analine can be used.

The gas generating system can be used, as earlier described, to form and cure other ethylenic unsaturated resin systems such as acrylic, vinyl, styrene and urethane systems. The gas generating system can be used in other thermoset polymeric systems such as epoxy, silicone, phenolic, nylon and urea systems, or in molten thermoplastics. Other blowing agents can be added, for instance fluorocarbons such as duPont's Freon 11, e.g. for thermal insulation purposes, although in many instances it is an advantage of the invention that such gases are unnecessary. Both rigid and flexible, open or closed cell foam products can be attained, and the resulting foams can be employed in operations such as spray up, hand-layup, press molding, expansion casting, RIM, RRIM, and resin transfer molding.

What is claimed is:

1. The method of producing carbon dioxide in a base mass of synthetic resin composition comprising
    dispersing a blowing agent consisting essentially of an organic isocyanate and an organic hydroperoxide in reactive quantities in said resin composition, and allowing said isocyanate and hydroperoxide to react while said resin composition is in a fluid state, to produce said carbon dioxide;
    the reactants being substantially free of water and other ingredients reactive with said isocyanate such that the preponderant gas-evolving reaction with said isocyanate is the reaction of said isocyanate with said organic hydroperoxide.

2. The method of claim 1 for producing cells throughout said mass of synthetic resin composition, comprising
    dispersing said isocyanate and hydroperoxide as a cell-producing agent throughout said composition under pressure conditions that permit the evolution of carbon dioxide gas as said reaction proceeds.

3. The method of claim 2 wherein said resin composition is curable to pass through a gellation stage before reaching a solid state, said method including
    initiating curing of said composition simultaneously with said gas-producing reaction, with the gas-producing reaction occuring before the gellation stage that would restrain expansion is reached, enabling the formation of a distribution of cellular voids throughout said composition,
    and allowing the curing of said composition to proceed to completion in a manner substantially maintaining said distribution of cellular voids throughout the cured composition.

4. The method of any of the claims 1, 2 or 3 wherein said reaction proceeds substantially according to the formula:

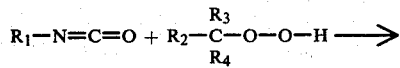

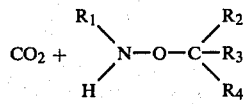

wherein $R_1$ is an aryl group, and $R_2$, $R_3$ and $R_4$ are selected from the groups consisting of aryl and aliphatic groups.

5. The method of claim 4 wherein $R_1$, $R_2$, $R_3$, and $R_4$ are hydrocarbons.

6. The method of any one of the claims 1-3 wherein said isocyanate has a reactivity greater than the reactivity of an essentially uncatalyzed aliphatic isocyanate.

7. The method of claim 6 wherein said isocyanate is an aromatic isocyanate.

8. The method of claim 7 wherein said isocyanate is methyl diphenyl isocyanate.

9. The method of any one of claims 1, 2 or 3 wherein, preceding said reaction, said resin is premixed with cell-producing agent comprising said isocyanate to form a stable mixture for later reaction with said hydroperoxide.

10. The method of claim 9 wherein said cell-producing agent includes a surfactant adapted to promote cell formation during reaction of said isocyanate with said hydroperoxide.

11. The method of any one of claims 1, 2 or 3 wherein said hydroperoxide is an alkyl hydroperoxide selected from the group cumene hydroperoxide and methyl ethyl ketone peroxide.

12. The method of any one of claims 1, 2 or 3 wherein said hydroperoxide is present in quantities in excess of the amount equivalent to said isocyanate, said resin has at least one polymerizable ethylenic unsaturation, and said excess hydroperoxide serves as a curing agent for said resin.

13. The method of claim 12 wherein said resin having at least one polymerizable ethylenic unsaturation is selected from the group consisting of polyester, styrene, acrylic, urethane and vinyl.

14. The method of any one of the claims 1-3 wherein said base resin is a thermoset resin selected from the group consisting of epoxy, phenolic, urea, isocyanurate and silicone.

15. The method of any of the claims 1 or 2 wherein said base resin is a thermoplastic.

16. The method of claim 1, 2 or 3 wherein all reactants are substantially free of hydroxyl and carboxyl groups and the resultant product is essentially free of urea, urethane or amide linkages.

17. The method of claim 2 or 3 comprising regulating the reactive quantities of isocyanate and hydroperoxide functional groups dispersed in a base resin, and the conditions of the reaction, to produce a synthetic resinous foam having a density of less than about 50 lbs/ft$^3$.

18. The method of claim 17 wherein said base resin is comprised substantially of unsaturated polyester, said isocyanate is present in quantities between about 5 and 25 percent by weight of said base resin, and said isocyanate and hydroperoxide are introduced in ratios between about 10 to 1 and 1 to 2 by weight, isocyanate to dilute hydroperoxide (said hydroperoxide constituting 60 percent of the solution).

19. The method of claim 18 for producing synthetic polyester foam having density less than about 12 lbs/ft$^3$ wherein said isocyanate and dilute hydroperoxide are present in a weight ratio in the range between about 3 to 1 and 1 to 2.

20. The method of claim 1, 2 or 3 for producing a substantially continuous synthetic resinous article having a strength property substantially similar to an article of substantially solid resin, comprising
    reacting said isocyanate and hydroperoxide in quantities to produce a distribution of cellular carbon dioxide voids throughout a substantially solid resinous mass.

21. The method of claim 20 wherein said cellular voids are effective to extend the resin and produce a product density in the range of about 30 to 60 lbs/ft$^3$.

22. The method of claim 20 wherein said voids are microcellular and said article has a density substantially unaffected by the gas cells present.

23. The method of any one of claims 1, 2 or 3 wherein said reaction is effective to deposit an amine oxide through said resin.

24. A resinous article having cellular voids produced by gas,
said article formed by dispersing a blowing agent consisting essentially of an organic isocyanate and an organic hydroperoxide in reactive quantities in a base mass of synthetic resin composition,
allowing said isocyanate and hydroperoxide to react while said resin composition is in a fluid state, to produce carbon dioxide gas,
initiating curing of said composition, with the composition formulated so the gas-producing reaction occurs before the gellation stage that would restrain expansion is reached, enabling the formation of a distribution of said cellular voids throughout said composition, said curing proceeding to completion in a manner substantially maintaining said distribution of cellular voids throughout the cured composition,
the reactants being substantially free of water and other ingredients reactive with said isocyanate such that the preponderant gas-evolving reaction with said isocyanate is the reaction of said isocyanate with said organic hydroperoxide,
said article being substantially free of urea linkages and containing amine oxide as the reaction product of said isocyanate and organic hydroperoxide.

25. The article of claim 24 wherein an amine oxide is present in the composition of said article as a result of said reaction.

26. The article of claim 24 or 25 wherein said resinous article is cellular foam.

27. The article of claim 24 or 25 wherein said resinous article is a closed cell foam, the gas in said cells comprises $CO_2$ produced at least in part by said reaction of said isocyanate with said hydroperoxide.

28. The article of claim 24 or 25 wherein the resin of said resinous article has at least one polymerizable ethylenic unsaturation and said resin is selected from the group consisting of polyester, styrene, acrylic, urethane and vinyl.

29. The article of claim 24 or 25 wherein the resin of said resinous article is essentially free of amide, urea, or urethane linkages.

30. The article of claim 24 or 25 wherein the base resin of said article is a thermoset resin selected from the group consisting of silicone, epoxy, phenolic, urea, and isocyanurate.

31. The article of claim 24 or 25 wherein the resin of said article is a thermoplastic.

32. The article of claim 24 or 25 wherein said isocyanate is a polyisocyanate and said article is a polyester urethane.

33. The article of claim 26 wherein said cellular foam contains polymeric amide oxide in the cell walls.

34. A formed resinous article comprised of resin having voids produced by gas from the reaction of a foaming agent consisting essentially of an organic hydroperoxide, and methyl diphenyl isocyanate and a surfactant,
the reactants being substantially free of water and other ingredients reactive with said isocyanate such that the preponderant gas-evolving reaction with said isocyanate is the reaction of said isocyanate with said organic hydroperoxide,
said article being substantially free of urea linkages and containing amine oxide as the reaction product of said isocyanate and organic hydroperoxide.

35. An amine oxide cellular product comprising the reaction product of reactants consisting essentially of an organic isocyanate and organic hydroperoxide functional groups, said reactants being substantially free of water and other ingredients reactive with said isocyanate, said product being substantially free of urea linkages.

36. The amine oxide cellular product of claim 35 produced according to the reaction formula:

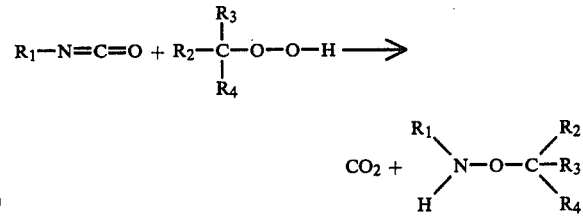

wherein $R_1$ is an aryl group, and $R_2$, $R_3$ and $R_4$ are selected from the groups consisting of aryl and aliphatic groups.

37. The method of producing a cured cellular resin composition comprising dispersing in a fluid uncured resin composition a curing agent and, in addition, a blowing agent consisting essentially of an organic isocyanate and an organic hydroperoxide in reactive quantities as a cell producing agent,
the curing agent adapted during cure to cause said resin to pass through a gellation stage before reaching a solid, cured state,
all ingredients in said dispersion being substantially free of water and of other ingredients reactive with said isocyanate such that the preponderant gas-evolving reaction with said isocyanate will be the reaction of said isocyanate and said organic hydroperoxide,
controlling the conditions of the gas-evolving reaction of said isocyanate and organic hydroperoxide and said curing reaction to provide a predetermined period of induction between said step of dispersing said ingredients and said gas evolving reaction and to cause said isocyanate and organic hydroperoxide to react to produce carbon dioxide dispersed in cellular voids through said composition prior to the gellation stage of said curing reaction,
and allowing the curing reaction to proceed to completion in a manner to substantially maintain distribution of cellular voids throughout the cured composition.

38. The method of claim 37 wherein said uncured resin is unsaturated polyester, and said curing agent is also an organic hydroperoxide.

39. The method of claim 38 wherein different quantities of the same organic hydroperoxide serve as said curing agent and said reactant with said isocyanate.

40. The method of any of the claims 37, 38 or 39 wherein said organic hydroperoxide of said cell producing agent is an alkyl hydroperoxide.

41. The method of claim 40 wherein said hydroperoxide is methyl ethyl ketone peroxide.

42. The method of claim 40 wherein said hydroperoxide is cumene hydroperoxide.

43. The method of any one of claims 37, 38, 39 or 40 wherein said conditions of reaction are regulated to provide an induction period prior to said gas evolution of a selected duration between about one and twelve minutes.

* * * * *